United States Patent [19]
Chase

[11] Patent Number: 5,478,127
[45] Date of Patent: Dec. 26, 1995

[54] COMPLIANT ATTACHMENTS FOR A HOOD-MOUNTED FLEXIBLE GRILLE

[75] Inventor: Lee A. Chase, Ada, Mich.

[73] Assignee: Lacks Industries, Inc., Grand Rapids, Mich.

[21] Appl. No.: 187,833

[22] Filed: Jan. 28, 1994

[51] Int. Cl.⁶ .................................................. B60R 19/52
[52] U.S. Cl. ........................ 293/115; 293/135; 293/136; 180/68.6
[58] Field of Search ..................................... 293/115, 132, 293/135, 136, 155; 180/68.6, 69.2, 69.21; 296/189

[56] References Cited

U.S. PATENT DOCUMENTS

| | | | |
|---|---|---|---|
| 2,578,068 | 12/1951 | Johnson | 293/132 |
| 3,792,889 | 2/1974 | Fuener et al. | 293/115 |
| 4,354,566 | 10/1982 | Yuda | 180/68.6 |
| 4,645,250 | 2/1987 | Bauer et al. | 293/115 |
| 4,753,468 | 6/1988 | Szymczak et al. | 293/132 |
| 4,917,203 | 4/1990 | Sacco et al. | 180/69.21 X |
| 4,944,540 | 7/1990 | Mansoor et al. | 293/115 |
| 5,100,188 | 3/1992 | Stieg | 293/115 |

*Primary Examiner*—Andrew C. Pike
*Attorney, Agent, or Firm*—Remy J. VanOphem; John VanOphem

[57] ABSTRACT

A flexible automobile grille, particularly suited for mounting flush with an impact-absorbing bumper, is capable of resiliently deflecting with the stroke of the bumper. The grille is provided with a dual support arrangement by which an upper edge of the grille is resiliently attached directly to the automobile engine hood, while the lower edge is resiliently supported by support members which interconnect the grille's lower edge to the engine hood. The dual support approach of this invention serves to enable greater stroking of the grille during impact, yet contributes additional rigidity to make the grille relatively unsusceptible to road and aerodynamically induced vibrations, and amenable to physical handling during opening and closing of the engine hood.

20 Claims, 4 Drawing Sheets

COMPLIANT ATTACHMENTS FOR A HOOD-MOUNTED FLEXIBLE GRILLE

BACKGROUND OF THE INVENTION

1. Field of the Invention

The present invention generally relates to automobile grilles positioned at the front end of an automobile. More specifically, this invention relates to a flexible automobile grille which is compliantly mounted directly to the automobile's engine hood, wherein a number of resilient supports are utilized to provide rigidity to the grille while permitting flexure of the grille relative to the engine hood. The grille of this invention is particularly well suited for use with impact-absorbing bumpers which automatically rebound from a frontal impact.

2. Description of the Prior Art

Automobile grilles have generally evolved from what once was primarily a protective barrier, to its present status as primarily a decorative feature, though also often serving as the primary source of ventilation to the automobile's radiator. Accordingly, early grilles were formed from metal so as to have adequate strength to deflect objects from hitting the radiator. Today, the role of the automobile grille as a barrier has been largely supplanted by modern practices which position the radiator such that it is protected by other means. However, for styling purposes, the automobile grille is still present on most modern automobiles, though generally formed from plastic for lighter weight.

With the advent of energy- or impact-absorbing bumpers, automobile grilles have been required to undergo significant design changes in order to accommodate the stroke of the bumper, which can be as much as 3 to 4 inches. Current grille designs have primarily taught three solutions to this problem. The first and traditional solution is to position the grille entirely out of the path of the bumper during recoil after impact. This approach generally entails placing the automobile grille rearward of the bumper, resulting in an extremely square-looking profile which has little appeal according to modern design trends. In addition, such a design is not aerodynamic, and as such this approach is not generally followed, particularly as fuel efficiency becomes increasingly important. A second solution is to completely eliminate the grille, which generally entails sweeping the engine hood down such that it is suspended just above the bumper line. However, this approach has not been widely adopted in that it has rather limited styling appeal.

A third solution is to require the grille to be displaceable such that it can pivot or otherwise move out of the bumper's path during impact. Preferably, this approach allows the grille to be mounted flush with the surrounding hood, front end, body panels, and bumper so as to enhance the styling effect and aerodynamics of the automobile. Such an approach is illustrated by U.S. Pat. No. 3,792,889 to Fuener et al. There, a sequentially moving grille is taught in which the lower edge of the grille is pivotally secured to the automobile body while the upper edge of the grille is allowed to rotate about the lower edge. During impact, the rearward travel of the bumper forces the grille to pivot rearwardly about the grille's lower edge and against a spring element. Another example of the third approach is taught by U.S. Pat. No. 4,753,468 to Szymczak et al., which provides a pivot arm which pivots the grille rearwardly and upwardly during impact. Yet another example is shown in U.S. Pat. No. 4,834,436 to Nguyen, which substantially eliminates the arcuate displacement of the grilles of both Fuener et al. and Szymczak et al. by employing a four-bar linkage that displaces the grille in an entirely rearward manner during impact. U.S. Pat. No. 4,944,540 to Mansoor et al. also seeks to avoid an arcuate path by the grille during impact by a pin and slot arrangement having a return spring.

As can be readily appreciated by those skilled in the art, the above examples corresponding to the third solution all entail additional hardware and space to accommodate the displacement of the grille. In addition, the added hardware is also necessary to adequately support the grille so as to be able to withstand wind resistance and road vibration while the vehicle is in use. But the additional hardware requirement itself is a disadvantage when it comes to both costs and weight from the standpoint of the vehicle manufacturer. The added costs entailed in purchasing and installing the above required hardware to achieve the desired results will generally be significant, while the additional weight adversely affects the performance and fuel economy of the vehicle. Both considerations are of primary importance in the highly competitive automobile market.

An approach which tends to avoid the problems noted above is illustrated in U.S. Pat. No. 2,578,068 to Johnson. Johnson teaches a resilient grille and bumper combination which is resiliently attached at its lower edge to the automobile's frame. A more modern version of this approach is illustrated by U.S. Pat. No. 4,917,203 to Sacco et al. There, a grille is disclosed which is supported within a U-shaped radiator cover. The radiator cover is secured to and suspended from the engine hood by a pair of resilient inner plates which allow the radiator cover to elastically deflect when the bumper is impacted. An advantage to the above structure is that the added hardware and weight associated with the teachings of Fuener et al., Szymczak et al., Nguyen, and Mansoor et al. are avoided. In addition, Sacco et al. particularly illustrate the styling and aerodynamic benefits to the automobile when the grille is mounted flush with the surrounding body panels and bumper. However, the grille taught by Sacco et al. has a significant disadvantage, in that the resilient inner plates provide minimal support for the radiator cover. As a result, the radiator cover taught by Sacco et al. is highly susceptible to wind and road vibrations, and is likely to feel flimsy when handled while opening or closing the engine hood.

As a solution to each of the above shortcomings, U.S. Pat. No. 5,205,597 to Chase, assigned to the assignee of this invention, teaches an automobile grille which has the advantages of being able to deflect with the bumper during impact, yet is sufficiently supported by the automobile body so as to be able to resist road and aerodynamically-induced vibrations without requiring added hardware and weight. The solution taught by Chase involves varying the section modulus of a portion of the grille's structure to provide a mode of resiliency, thereby enabling the grille to absorb an impact with the bumper while still being securely attached along its periphery to the automobile body. Chase teaches a grille formed entirely from a resilient impact-resistant material, such as a high impact plastic, having a yield strength which is sufficient to endure the amount of deflection required to deflect with the bumper's stroke.

While the solution taught by Chase enables the automobile grille to flex significantly without sustaining permanent damage, some applications require that an automobile grille be capable of being stroked in excess of that possible with the grille taught by Chase. With such applications, the degree to which a grille must be capable of being stroked necessitates minimal support of the grille, which is detrimental to the stability and rigidity of the grille, as noted previously with the radiator cover taught by Sacco et al. In view of the prior art noted above, it would be expected that a grille constructed in accordance with the teachings of Johnson and Sacco et al., and having a greater stroke capability than that of Chase, would be highly susceptible to road and aerodynamically-induced vibrations, and feel flimsy when being handled while the engine's hood is being opened and closed.

Accordingly, what is needed is a flexible automobile grille which is particularly suited for use with impact-absorbing bumpers that automatically rebound from a frontal impact, wherein the grille is capable of sustaining significantly greater impacts than that made possible by Chase, yet is characterized by sufficient stability and rigidity so as to make the grille relatively unsusceptible to road and aerodynamically-induced vibrations, and amenable to physical handling during opening and closing of the engine hood.

SUMMARY OF THE INVENTION

According to the present invention there is provided an elastic automobile grille for installation in an automobile having an impact-absorbing bumper. The grille is configured to be mounted substantially flush with the surrounding automobile front end body panels and bumper, and capable of deflecting with the stroke of the bumper during impact. The grille of the present invention is provided with a dual support arrangement by which the upper edge of the grille is resiliently attached directly to the automobile engine hood, while the lower edge is resiliently supported by support members which interconnect the lower edge to the engine hood. The dual support approach of this invention serves to enable greater stroking of the grille during impact, yet contributes additional rigidity to make the grille relatively unsusceptible to road and aerodynamically-induced vibrations, and amenable to physical handling during opening and closing of the engine hood.

Generally, the grille is composed of a body member having an elongate first segment and a second segment spaced apart from the first segment. At least a portion of the body member is preferably formed from a polymeric material having a predetermined flexural modulus, such that the body member is able to elastically flex while sustaining an impact from a source external to the automobile. A flange extends from the first segment of the body member so as to be juxtaposed with an edge of the engine hood when the grille is mounted to the automobile. Fasteners are used to secure the flange to the engine hood so as to directly secure the automobile grille to the automobile, such that the flange enables the automobile grille to resiliently pivot relative to the edge of the engine hood during an impact. Finally, resilient support members are attached to the second segment of the body member for resiliently attaching the body member to the engine hood so as to support, stabilize, and rigidize the automobile grille relative to the automobile. As a result of the above structure, the automobile grille is readily able to flex when impacted without plastically deforming the body member, the resilient support members, or the flange.

Preferably, the automobile grille is formed from an impact-resistant thermoplastic, such as a polycarbonate or acrylonitrile-butadiene-styrene. Many other impact resistant plastic materials can be used. In accordance with U.S. Pat. No. 5,205,597 to Chase, in order to enhance the deflection capability of the grille, portions of the grille structure are preferably formed to have variable section moduli, so as to enhance the degree of yielding which can be achieved without exceeding the yield strength of the material. As a result, the flexibility of the entire automobile grille is enhanced.

In order to more fully exploit the degree of flexibility provided by a grille formed in accordance with the teachings of Chase, at least two resilient support members are utilized with the grille of this invention, with one resilient support member being attached to each end of the grille. While the resilient support members can be composed of a single flexible member, other suitable configurations include a pair of co-acting flexible members which may be interconnected with struts that contribute rigidity to the resilient support members while enabling a degree of resiliency. More than two resilient support members can be utilized as required to achieve the desired rigidity for the grille.

A significant advantage of the present invention is that the grille is capable of a greater degree of flexing during an impact in which the impact-absorbing bumper is stroked. Specifically, the grille of this invention is configured to resiliently pivot relative to the edge of the engine hood, such that the grille's lower edge is readily able to stroke rearwardly with the bumper. Yet, the grille is also firmly supported by the engine hood along the grille's upper edge and through the resilient support members attached at the lower edge of the grille. As a result, the grille is sufficiently secured so as to be resistant to aerodynamic and road-induced vibrations, yet will readily flex when impacted directly or forced to stroke with the bumper during an impact. Enhanced flexibility also improves the ability of the grille to withstand an impact without suffering permanent damage.

In addition, a significant advantage of this invention is that the advantages made possible by the teachings of Chase can be incorporated in the present invention. Specifically, the section modulus of certain regions of the grille can be modified to further enhance the flexural properties of the grille without affecting the dual support structure of this invention. As a result, optimum flexural properties can be achieved for a given grille design.

Accordingly, it is an object of the present invention to provide an automobile grille which is able to withstand a predetermined impact without permanently damaging the grille.

It is a further object of this invention that such an automobile grille be suitable for use on an automobile having an impact-absorbing bumper, such that the grille is capable of resiliently deflecting with the maximum stroke of the bumper.

It is still a further object of this invention that the grille is secured along an upper edge thereof to the engine hood of the automobile, such that the grille is able to pivot relative to the edge of the engine hood when deflecting with the bumper during impact.

It is still a further object of this invention that the grille is secured along a lower edge thereof to the engine hood with a number of resilient support members, such that the grille is able to resiliently rotate relative to the edge of the engine hood, yet is structurally resistant to environmental effects such as wind and vibration.

It is another object of this invention that flexing of the grille can be concentrated in predetermined regions of the grille, so as to enhance the flexural properties of the grille.

Other objects and advantages of this invention will be more apparent after a reading of the following detailed description taken in conjunction with the drawings provided.

DETAILED DESCRIPTION OF THE PREFERRED EMBODIMENT

Figure 1:
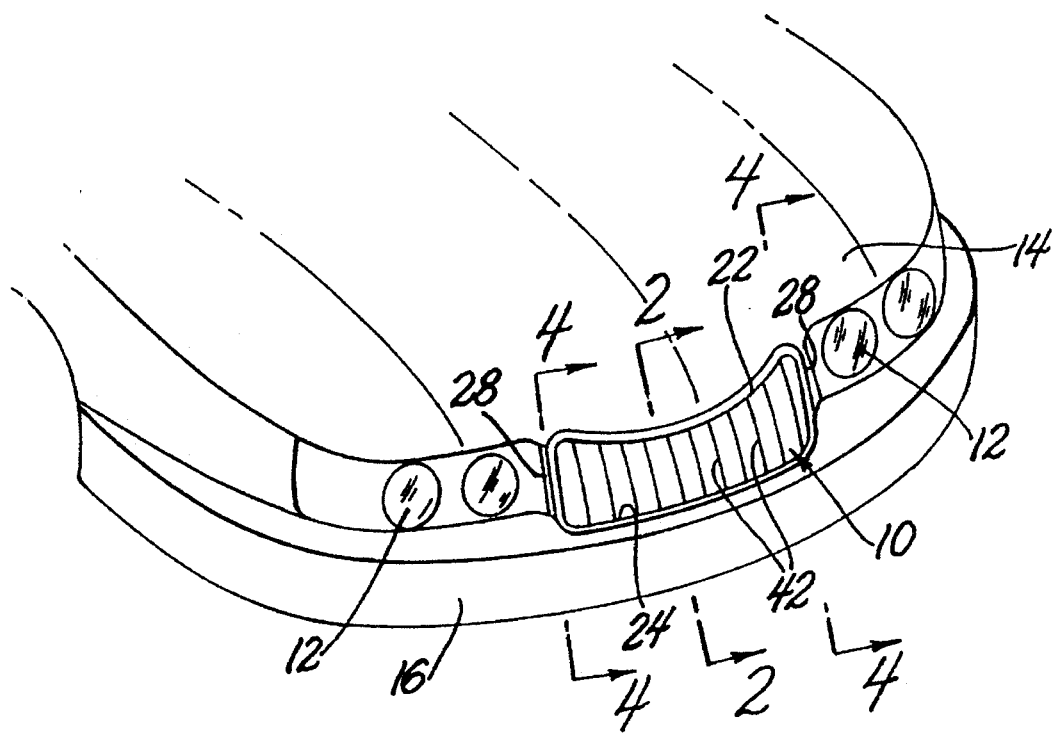
FIG. 1 is a frontal view of an automobile front end having an impact-absorbing bumper and a grille mounted to the engine hood, in accordance with a preferred aspect of this invention.

With reference to FIG. 1, there is shown a front end portion of an automobile having a decorative grille 10 secured to its engine hood 14. As illustrated, the grille 10 is mounted to the front edge of the engine hood 14 between a pair of headlamps 12, such that the grille 10 is suspended above a front bumper 16 of the automobile. According to a preferred aspect of this invention, the grille 10 can be mounted so as to be substantially flush with its surrounding automobile body panel structure, such as the bumper 16, the hood 14, and the headlamps 12, as shown in FIG. 1. In addition, the bumper 16 is preferably an impact-absorbing bumper which is designed to withstand and absorb a predetermined impact without permanent deformation. At this time, such bumpers 16 are required to absorb a 5-mile-per-hour impact, after which the bumper 16 must return to its pre-impact position. During the course of an impact, the bumper 16 may travel rearward of the automobile front end portion three inches or more. After impact, during which the energy of the impact is dissipated through the resilient structure of the bumper 16, the bumper 16 will return to its original position.

Because the grille 10 is mounted substantially flush with the bumper 16, the grille 10 is required to resiliently respond to an impact to the bumper 16, necessitating that the grille 10 also be able to resiliently flex three inches or more. The grille 10 is generally formed to have a patterned central portion which includes cross-hatch members or, as shown, vertical grille members 42 for both cosmetic and structural purposes. As seen in FIG. 1, the grille 10 has an upper support member 22 which generally extends horizontally adjacent a portion of the flange of the engine hood 14 of the automobile, and a lower support member 24 which generally extends horizontally adjacent the bumper 16. A pair of vertical supports 28 interconnect the adjacent lateral ends of the upper and lower support members 22 and 24.

Figure 2:
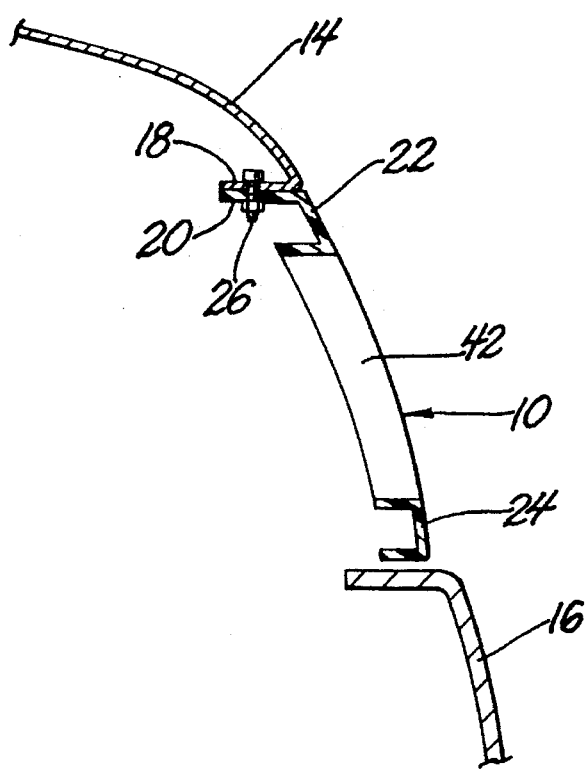
FIG. 2 is a cross-sectional view taken along line 2—2 of FIG. 1 in accordance with a first embodiment of this invention.
Figure 3:
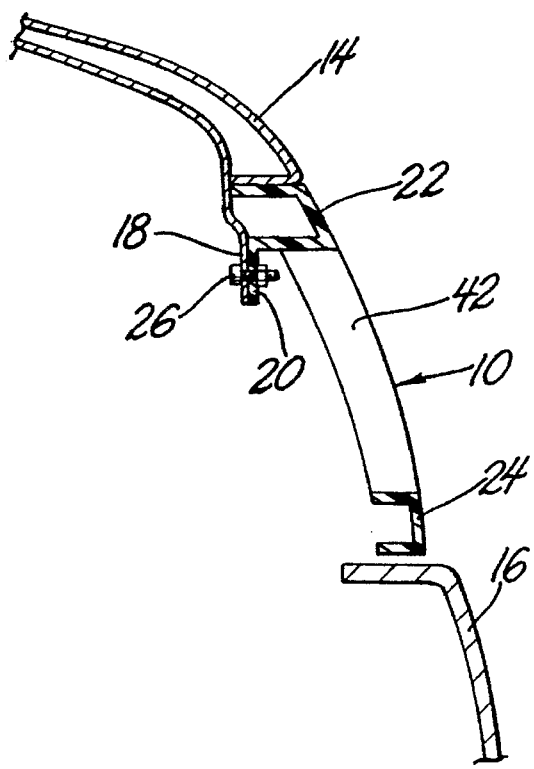
FIG. 3 is a cross-sectional view taken along line 2—2 of FIG. 1 of an alternate configuration of the grille in accordance with an alternate embodiment of this invention.
Figure 4:
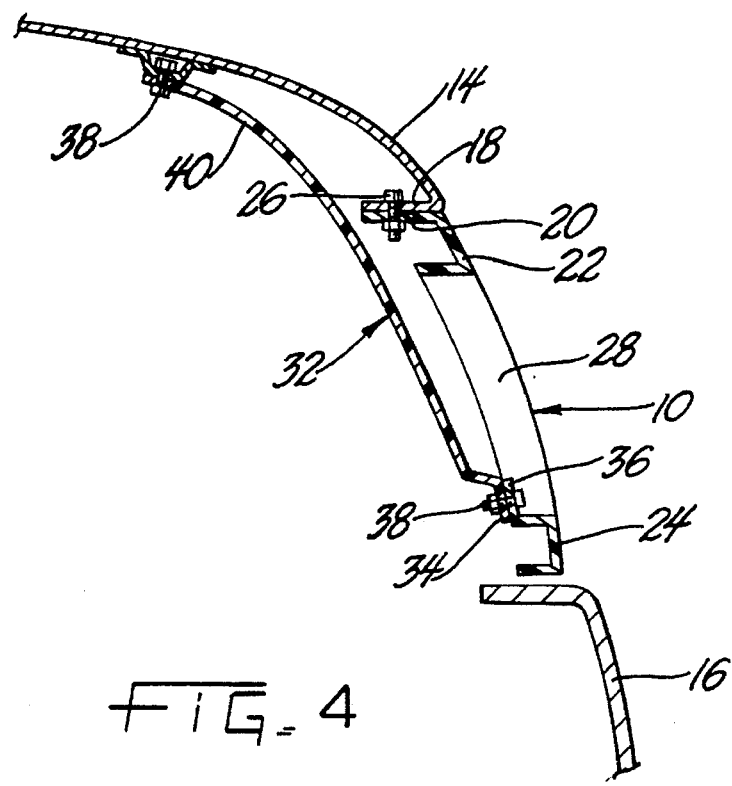
FIG. 4 is a cross-sectional view of the grille taken along lines 4—4 of FIG. 1 in accordance with the first embodiment of this invention.

In accordance with a first embodiment shown in FIGS. 2, 3, and 4, an upper grille flange 20 extends from the upper support member 22, and is oriented to be attached with a fastener 26 to a return flange 18 projecting from the hood 14. The upper grille flange 20 can be provided as a single flange or a number of individual flanges which are formed along the entire length of the upper support member 22, with a number of fasteners 26 being used to secure the upper grille flange or flanges 20 to the return flange 18 of the hood 14. FIG. 2 represents a first configuration for the upper grille flange 20 and the return flange 18, in which each is oriented to be substantially horizontal. With this configuration, both the return flange 18 and the upper grille flange 20 flex during impact, roughly generating a rotational movement relative to the front edge of the hood 14. FIG. 3 represents a second configuration for the upper grille flange 20 and the return flange 18, in which each is oriented to be substantially vertical. The return flange 18 can be formed as an integral part of the hood 14 or, as shown, can be formed by a panel joined to the hood 14. With this configuration, it is the return flange 18 which primarily flexes during impact, though the resultant reaction is again roughly a rotational movement relative to the front edge of the hood 14.

Regardless of the orientation of the return flange 18 and upper grille flange 20, each end of the lower support member 24 is configured to be attached to the hood 14 with a resilient support member 32, as shown in FIG. 4. Upper and lower ends 40 and 34 of each resilient support member 32 are secured with fasteners 38 to a rearward portion of the hood 14 and to a lower grille flange 36 extending from the lower support member 24, respectively. Any suitable fastening device or technique may be used, such as the threaded fasteners illustrated, though consideration must be given for the requirement that the fastening device or technique be structurally resistant to wind and vibrational forces generated when the automobile is in motion. Secured in the above manner, the midsection of the grille 10 is able to flex relative to the lateral ends of the grille 10 when impacted from the front of the automobile. However, where greater rigidity is required, the lower support member 24 can be secured to the hood 14 with additional resilient support members 32 at intermediate locations between the lateral ends of the lower support member 24.

Because the grille 10 described above is required to resiliently flex with the bumper 16 during a collision, the material and structure of the grille 10 must be such that the flexure within the grille 10 acts to absorb the impact without the grille 10 fracturing. Accordingly, the material of the grille 10 must be resilient and have sufficient impact resistance to withstand the hostile environment of the bumper 16. A particularly suitable material although not specifically restricted for use for the grille 10 is a high impact plastic, such as polycarbonate (PC), acrylonitrile-butadiene-styrene (ABS), or a modified PC/ABS material. Because flexing occurs in the central and lower portions of the grille 10 during relatively low impacts, it is preferable that the lower support member 24 and the vertical grille members 42 be formed from a suitable high impact polymeric material. Furthermore, because considerable flexing occurs. in the upper grille flange 20 of FIG. 2 during high impacts in which the bumper stroke is great, the upper grille flange 20 of this configuration is also preferably formed from a suitable high impact material. Manufacturing practices will typically favor forming the entire grille 10 from the same impact-resistant material.

In accordance with the teachings of U.S. Pat. No. 5,205,597 to Chase, the section modulus of certain regions of the grille 10 can be modified to further enhance the flexural properties of the grille 10 without affecting the manner in which the grille 10 is supported by the upper grille flange 20 and the resilient support members 32. As a result, optimum flexural properties can be selectively achieved for a given grille design.

During impact, the resilient support members 32 must also be capable of bending along substantially their entire lengths, in order to allow the lower support member 24 to travel rearwardly. Accordingly, for purposes of the present invention, it is preferable that the resilient support members 32 also be formed from a high impact polymeric material, though the resilient support members 32 could alternatively be formed from a suitably resilient metal or a plastic-coated metal. The optimal cross-sectional shape and size of the resilient support members 32 will depend on the material from which the resilient support members 32 are formed, as well as their active length over which they are required to flex. Those skilled in the art will be capable of determining a suitable material taking into consideration the cross-sectional size and configuration with minimal experimentation.

In the discussion that follows relative to the second, third and fourth embodiments of the invention, like components to that just described in the preferred embodiment are identified with the same reference numeral increased by 100, 200 and 300, respectively.

Figure 5:
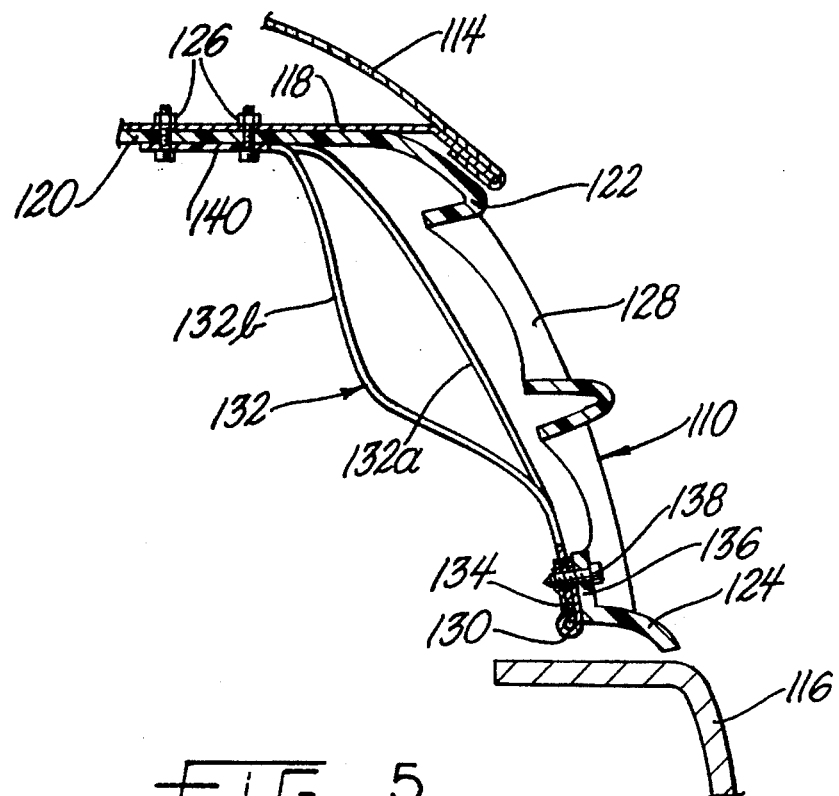
FIG. 5 is a cross-sectional view similar to FIG. 2 of an automobile front end in accordance with a second embodiment of this invention.
Figure 6:
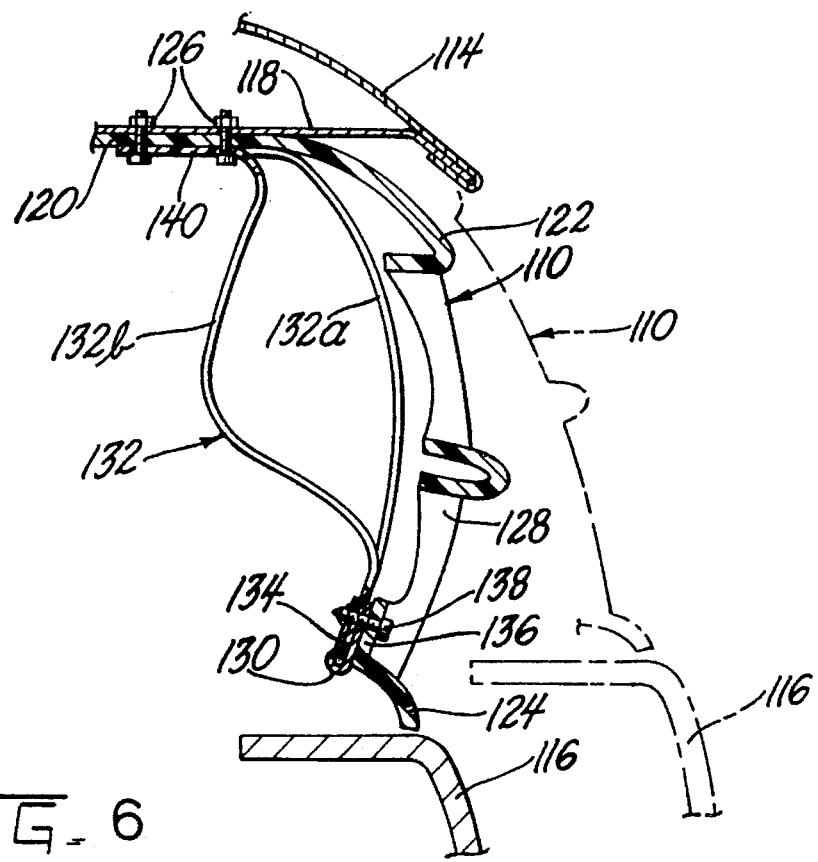
FIG. 6 is a cross-sectional view similar to FIG. 2 showing the deflected position of the structure of the second embodiment of this invention.

Represented in FIGS. 5 and 6 is a grille 110 formed in accordance with a second embodiment of this invention. As shown, the grille 110 is attached to an engine hood 114 so as to be supported above a front bumper 116, and is composed of an upper support member 122, a lower support member 124, and vertical support members 128, in a manner similar to the first embodiment of FIGS. 2, 3, and 4. As before, the grille 110 is preferably formed from a polycarbonate, acrylonitrile-butadiene-styrene, or modified PC/ABS material or other suitable high impact material. An upper grille flange 120 is shown as extending from the upper support member 122 rearward, and is attached with a pair of fasteners 126 to a hood flange 118 which is joined to the hood 114. As shown, the upper grille flange 120 and the hood flange 118 are both oriented to be substantially horizontal. The extended length of the upper grille flange 120 permits flexing to occur primarily with the upper grille flange 120 during impact, such that the grille 110 roughly generates a rotational movement relative to the front edge of the hood 114.

In contrast to the one-piece resilient support members 32 utilized with the grille 10 of the first embodiment, the lower support member 124 is configured to be attached to the hood 114 with two or more resilient support members 132, each of which is composed of a forward resilient member 132a and a rearward resilient member 132b. The upper end 140 of each resilient support member 132 is shown as being secured to the hood flange 118 with the fasteners 126, while the lower end 134 of each resilient support member 132 is secured with a fastener 138 to a lower grille flange 136 extending from the lower support member 124. As before, any suitable fastening device or technique may be used, such as the threaded fasteners illustrated. The forward and rearward resilient members 132a and 132b can be secured together with the fasteners 126 and 138, or can be joined by welding to form a unitary assembly. Where the forward and rearward resilient members 132a and 132b are secured together with the fasteners 126 and 138, a clip 130 may be used to assist in securing the lower ends 134 of the forward and rearward resilient members 132a and 132b to the lower grille flange 136. In accordance with the structure of the second embodiment of FIGS. 5 and 6, the grille 110 will resiliently flex with the bumper 116 during a collision in the manner shown in FIG. 6. As shown, the forward resilient member 132a flexes in a forward direction, while the rearward resilient member 132b flexes in a rearward direction. Again, the resilient support members 132 may also be formed from one of the preferred high impact polymeric materials, or from a suitably resilient metal or a plastic coated metal.

Figure 7:
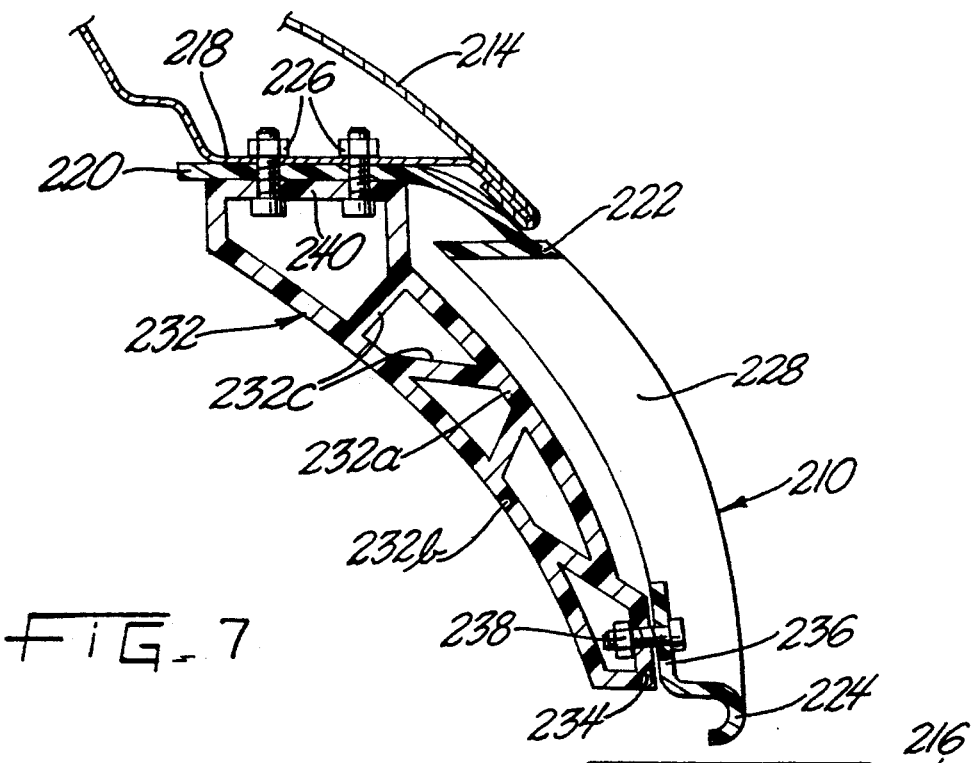
FIG. 7 is a cross-sectional view of an automobile front end in accordance with a third embodiment of this invention.
Figure 8:
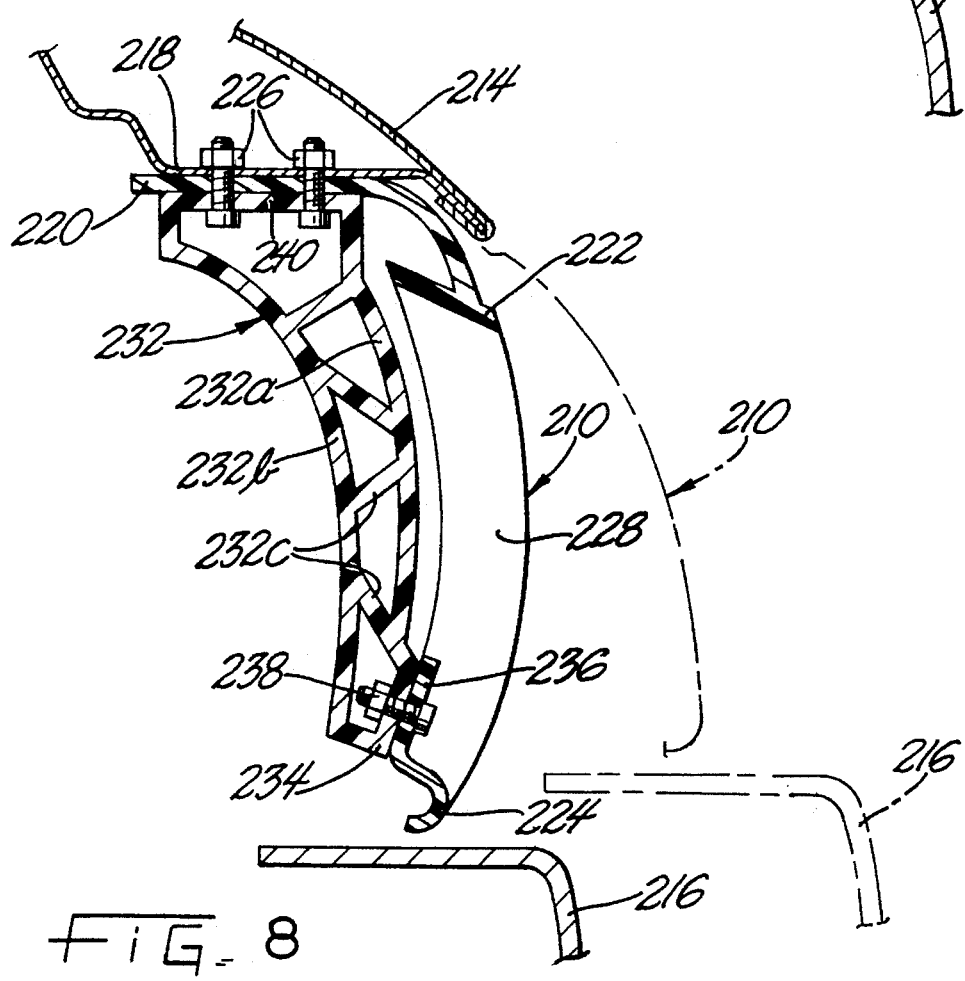
FIG. 8 is a cross-sectional view similar to FIG. 2 showing the deflected position of the structure of the third embodiment of this invention.

A third embodiment of a grille 210 is represented in FIGS. 7 and 8. Again, the grille 210 is attached to an engine hood 214 so as to be supported above a front bumper 216, and is composed of an upper support member 222, a lower support member 224, and vertical support members 228, in a manner similar to the first embodiment of FIGS. 2, 3, and 4. In addition, the grille 210 is preferably formed from a high impact material, one example of which is polycarbonate, acrylonitrile-butadiene-styrene, or modified PC/ABS material. An upper grille flange 220 is shown as extending a significant distance from the upper support member 222, and is attached with a pair of fasteners 226 to a hood flange 218 which is joined to the edge of the hood 214. As shown, the upper grille flange 220 and the hood flange 218 are both oriented to be substantially horizontal. The extended length of the upper grille flange 220 permits flexing to occur primarily with the upper grille flange 220 during impact, such that the grille 210 roughly generates a rotational movement relative to the front edge of the hood 214.

Two or more resilient support members 232 are used to attach the lower support member 224 to the hood 214. In contrast to the resilient support members of the previous embodiments, each of the resilient support members 232 is composed of a forward resilient member 232a, a rearward resilient member 232b, and a number of web members 232c which interconnect each forward resilient member 232a with its corresponding rearward resilient member 232b. The resilient support members 232 may also be formed from a high impact polymeric material, a suitably resilient metal, or a plastic-coated metal. As shown, the resilient support members 232 are formed as a unitary piece, though it is foreseeable that they could also be assembled with fasteners or joined by welding, bonding, or gluing. The upper end 240 of each resilient support member 232 is shown as being secured to the hood flange 218 with the fasteners 226, while the lower end 234 of each resilient support member 232 is secured with a fastener 238 to a lower grille flange 236 extending from the lower support member 224. As before, any suitable fastening device or technique may be used, such as the threaded fasteners illustrated.

In accordance with the structure of the third embodiment of FIGS. 7 and 8, the grille 210 will resiliently flex with the bumper 216 during a collision in the manner shown in FIG. 8. As shown, the resilient support members 232 flex in a rearward direction during impact. An added benefit of the webbed structure of the resilient support members 232 is the enhanced rigidity and stability of the grille 210. In cooperation with the manner in which the upper support member 222 is secured to the hood 214 with the upper grille flange 220, the grille 210 of the third embodiment is characterized by even greater resistance to road and aerodynamically-induced vibrations, while also being suitably rigid for handling when opening and closing the hood 214 and using the grille as a convenient "handle" to accomplish same.

Figure 9:
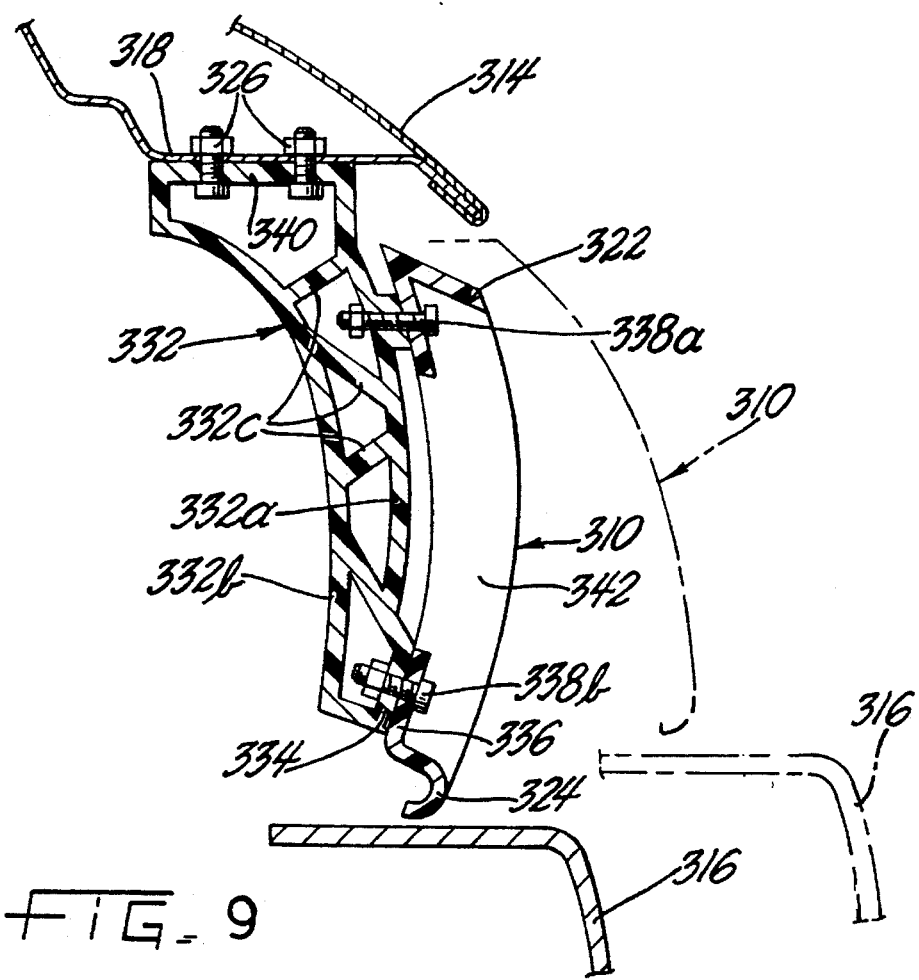
FIG. 9 is a cross-sectional view of an automobile front end in accordance with a fourth embodiment of this invention.

A final embodiment of this invention is illustrated in FIG. 9, which shows a grille 310 configured substantially as the grille 210 of the third embodiment. However, the upper grille flange 220 of the third embodiment is absent, such that the grille 310 is attached only to resilient support members 332 with a pair of fasteners 338a and 338b, so as to be supported entirely by the resilient support members 332. Consequently, the stabilizing and rigidizing effect resulting from the upper edge of the grille 310 being secured directly to the hood 314 is minimum, yet this is compensated to some degree by the considerable rigidity of the resilient support members 332 as a result of their lattice structure.

From the above, it can be appreciated that the present invention teaches the use of resilient support members 32, 132, 232, or 332 which serve to resiliently support the grilles 10, 110, 210, and 310 of this invention, while additional support is provided by securing the upper edge of the grilles 10, 110, and 210 directly to the engine hood of the automobile. The resilient support members can be composed of a single resilient member, or a pair of co-acting resilient members which may be interconnected with web members that contribute rigidity to the resilient support members, while also permitting a sufficient degree of resiliency. More than one resilient support member can be utilized as required to achieve the desired rigidity for the grille.

As a result, a grille formed in accordance with this invention is capable of a significant degree of flexing during an impact in which the bumper is stroked rearwardly. Specifically, the grilles of this invention are each configured to resiliently pivot relative to the front edge of the engine hood, such that their lower edges are readily able to stroke rearwardly with the bumper. Enhanced flexibility improves the ability of the grilles to withstand an impact without being plastically deformed. Yet, the grilles preferably are also firmly supported by the engine hood along their upper edge, and through the resilient support members attached at the lower edge of the grille. As a result, the grilles of this invention are sufficiently secured so as to be resistant to aerodynamic and road-induced vibrations, as well as amenable to physical handling during opening and/or closing of the engine hood.

Finally, an additional advantage of this invention is that the teachings of U.S. Pat. No. 5,205,597 to Chase can be incorporated in the present invention. Specifically, the section modulus of certain regions of the grilles can be modified to further enhance the flexural properties of the grilles without affecting the preferred dual support structure of this invention. As a result, flexibility of the grilles taught by this invention can be significantly modified and optimized for a variety of different applications.

Accordingly, the present invention provides an automobile grille which is more readily capable of withstanding a frontal impact without permanent damage to the grille, yet is relatively unsusceptible to road and aerodynamically induced vibrations, and is amenable to physical handling during opening and closing of the engine hood. By optimizing the ability of the grille to deflect rearwardly during impact, the resulting enhanced resiliency renders the grille particularly suitable for mounting flush with an impact-absorbing bumper, in that the grille is more readily capable of resiliently deflecting without plastic deformation throughout the entire stroke of the bumper. Furthermore, the overall feel of the grille and the perceived quality of the grille is enhanced by the added rigidity contributed by the dual support structure of this invention.

While the invention has been described in terms of several preferred embodiments, it is apparent that other forms could be adopted by one skilled in the art. For example, the geometry of the grille could be significantly altered, while still being able to take advantage of the enhanced flexibility achievable by the teachings of this invention. Accordingly, the scope of the invention is to be limited only by the following claims.

What is claimed is:

1. An elastic automobile grille for mounting to an edge of an engine hood of an automobile, said automobile grille comprising:

a body member having an elongate first segment and a second segment spaced apart from said first segment, at least a portion of said body member being formed from a high impact material having a predetermined flexural modulus such that said body member is able to flex while sustaining an impact from a source external to said automobile;

a flange extending from said first segment of said body member so as to be juxtaposed with said edge of said engine hood when said automobile grille is mounted to said automobile;

fastening means mounted to said flange for securing said body member to said engine hood so as to secure said automobile grille to said automobile, such that said flange enables said automobile grille to resiliently pivot relative to said edge of said engine hood while sustaining said impact from said source external to said automobile; and resilient means mounted to said second segment of said body member for resiliently attaching said body member to said engine hood so as to support, stabilize, and rigidize said automobile grille relative to said automobile;

whereby said automobile grille is readily able to flex when impacted by said source external to said automobile without plastically deforming said body member, said resilient means, or said flange.

2. The automobile grille of claim 1 wherein said high impact material is an impact-resistant thermoplastic selected from the group consisting of polycarbonate and acrylonitrile-butadiene-styrene.

3. The automobile grille of claim 1 wherein said resilient means comprises at least two resilient members, a corresponding one of said at least two resilient members being located at opposite ends of said second segment.

4. The automobile grille of claim 3 wherein each of said at least two resilient members comprises a pair of interconnected co-acting members which contribute rigidity to said automobile grille while enabling a degree of resiliency for said at least two resilient members.

5. The automobile grille of claim 4 wherein each said pair of interconnected co-acting members are interconnected with a plurality of web members which contribute rigidity to said at least two resilient members.

6. The automobile grille of claim 1 wherein said flange is oriented to be substantially horizontal, wherein said flange flexes during said impact by said source external to said automobile.

7. The automobile grille of claim 1 wherein said flange is oriented to be substantially vertical.

8. An elastic automobile grille for an automobile having a hood flange proximate to a front edge of an engine hood, said automobile grille comprising:

a body member having an elongate upper segment, a lower segment spaced apart from said elongate upper segment, and a pair of oppositely disposed ends, at least a portion of said body member being formed from a high impact material having a predetermined flexural modulus such that said body member is able to flex while sustaining an impact from a source external to said automobile;

a grille flange extending from said elongate upper segment so as to be juxtaposed with said hood flange when said automobile grille is mounted to said automobile;

fastening means mounted to said grille flange for securing said body member to said hood flange of said engine hood so as to secure said automobile grille to said automobile, wherein said grille flange and said hood flange cooperate so as to permit said automobile grille to resiliently pivot relative to said front edge of said engine hood while sustaining said impact from said source external to said automobile; and at least two resilient members secured to said lower segment for resiliently attaching said body member to said engine hood so as to support, stabilize, and rigidize said automobile grille relative to said automobile, a corresponding one of said at least two resilient members being located at each of said pair of oppositely disposed ends of said body member;

whereby said automobile grille is readily able to flex when impacted by said source external to said automobile without plastically deforming said body member, said at least two resilient members, said grille flange, or said hood flange.

9. The automobile grille of claim 8 wherein said high impact material is an impact-resistant thermoplastic selected from the group consisting of polycarbonate and acrylonitrile-butadiene-styrene.

10. The automobile grille of claim 8 wherein said grille flange and said hood flange are oriented to be substantially horizontal, wherein both said hood flange and said grille flange flex during said impact by said source external to said automobile.

11. The automobile grille of claim 8 wherein said grille flange and said hood flange are oriented to be substantially vertical, wherein said hood flange primarily flexes during said impact by said source external to said automobile.

12. The automobile grille of claim 8 wherein each of said at least two resilient members comprises a pair of interconnected co-acting segments which contribute rigidity to said at least two resilient members while enabling a degree of resiliency for said at least two resilient members.

13. The automobile grille of claim 8 further comprising a plurality of intermediate members interconnecting said elongate upper segment with said lower segment.

14. The automobile grille of claim 8 wherein said elongate upper segment extends along said front edge of said engine hood when said automobile grille is mounted to said automobile.

15. The automobile grille of claim 8 wherein said at least two resilient members are formed from a polymeric material.

16. The automobile grille of claim 8 wherein said at least two resilient members are formed from a metallic material.

17. The automobile grille of claim 8 wherein said at least two resilient members are formed from a metal member coated with a plastic.

18. An elastic automobile grille for an automobile having a hood flange proximate to a front edge of an engine hood and an impact-absorbing bumper which is movable upon an impact with an object external to said automobile, such that said impact-absorbing bumper subsequently returns to a pre-impact position after said impact is dissipated, said automobile grille comprising:

an upper segment located at an upper edge of said automobile grille, said upper segment having a grille flange extending therefrom so as to be juxtaposed with said hood flange when said automobile grille is mounted to said automobile, said grille flange being formed from a high impact material having a predetermined flexural modulus, said upper segment further having means for fastening said grille flange to said hood flange such that said grille flange and said hood flange cooperate to permit said automobile grille to resiliently pivot relative to said front edge of said engine hood while sustaining said impact with said object;

a lower segment located at a lower edge of said automobile grille so as to be spaced apart and substantially parallel to said upper segment, said lower segment having an oppositely disposed pair of ends;

a plurality of intermediate members interconnecting said upper and lower segments; and a plurality of resilient members secured to said lower segment for resiliently attaching said automobile grille to said engine hood so as to support, stabilize, and rigidize said automobile grille relative to said automobile, a corresponding one of said plurality of resilient members being located at each of said pair of oppositely disposed ends of said lower segment;

whereby said automobile grille is readily able to flex when impacted by said object without plastically deforming said upper and lower segments, said plurality of resilient members, said grille flange, or said hood flange.

19. The automobile grille of claim 18 wherein said high impact material is an impact-resistant thermoplastic selected from the group consisting of polycarbonate and acrylonitrile-butadiene-styrene.

20. The automobile grille of claim 18 wherein said upper and lower segments, said plurality of intermediate members, and said plurality of resilient members are formed from a polymeric material.

* * * * *